Feb. 10, 1942.   V. P. McVOY   2,272,416
NONSKID REAR SYSTEM FOR AUTOMOBILES
Filed Feb. 7, 1941   2 Sheets-Sheet 2
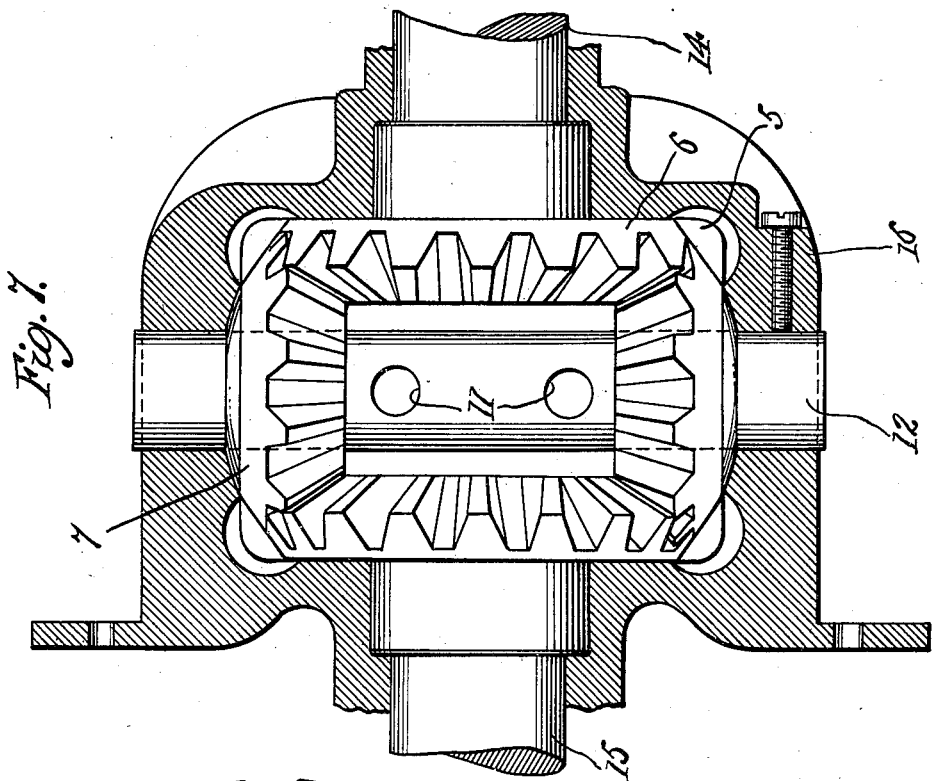
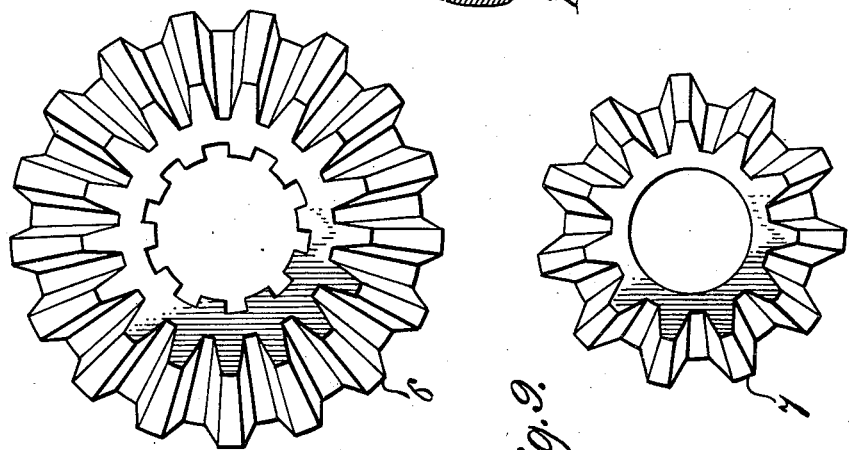
Inventor
Vincen P. McVoy
By Mawhinney & Mawhinney
Attorneys Patented Feb. 10, 1942

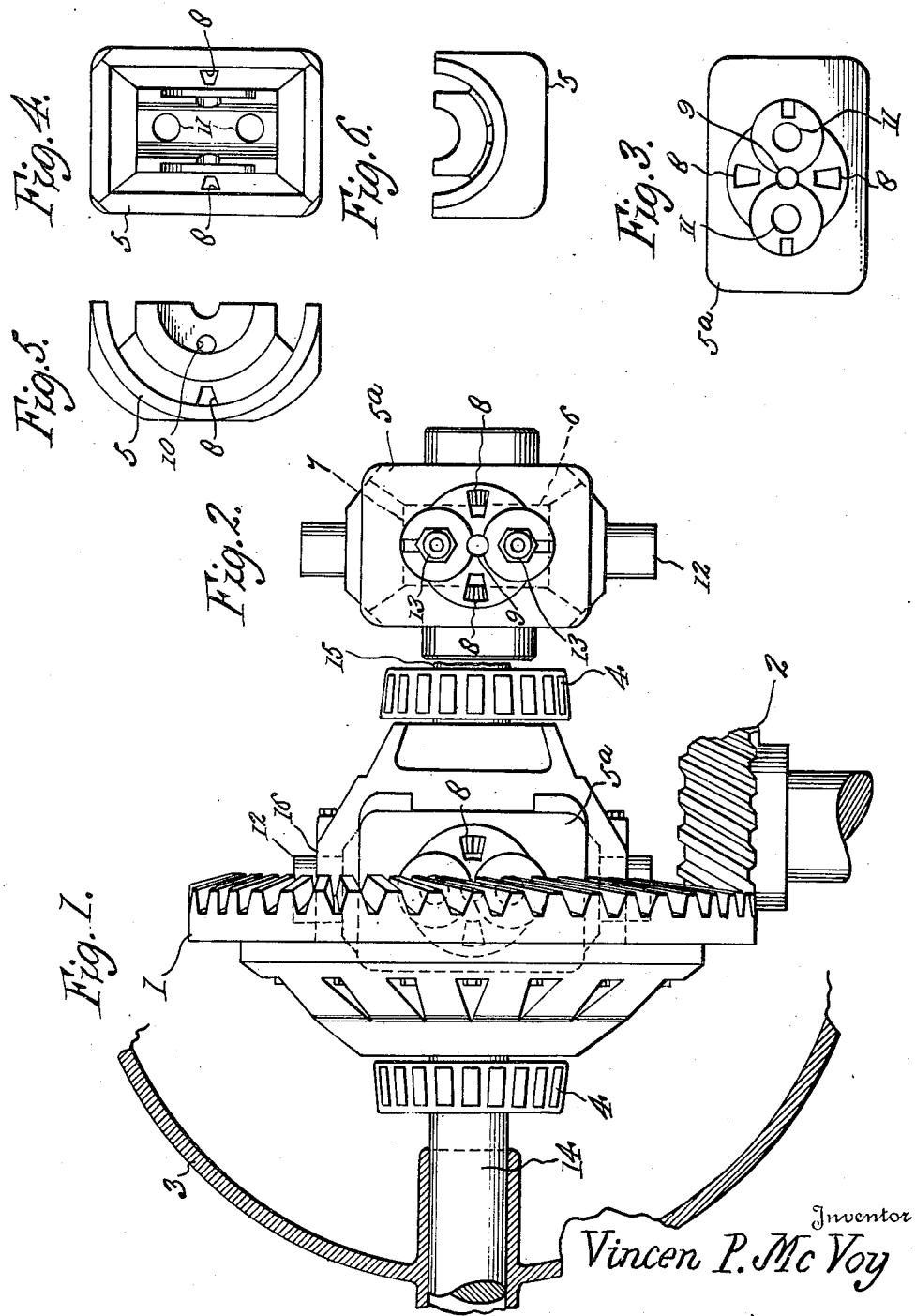

2,272,416

UNITED STATES PATENT OFFICE 2,272,416

NONSKID REAR SYSTEM FOR AUTOMOBILES

Vincen P. McVoy, Mobile, Ala.

Application February 7, 1941, Serial No. 377,929

5 Claims. (Cl. 74—315)

The present invention relates to improvements in non-skid rear systems for automobiles and to methods and processes for controlling the differential actuation of the two rear axial sections and the two rear drive wheels of an automobile for safety purposes, particularly when one of the rear driving wheels encounters slippery or shifting surfaces.

The purpose of the present invention is to prevent skidding on slippery or wet roads, and to act as an aid to the vehicle in moving out of bogs, sand or the like, and to this end the device and the process aim to prevent excess slippage on either rear driven wheel.

In running off the pavement, where there is loose sand on the outside shoulder, and particularly when the pavement is higher than the shoulder, such condition is known to be a very dangerous position for an automobile. In such cases the off wheel spins with relation to the opposite wheel which remains on the road, and thereby there ensues an unusual differential movement, often resulting in turning the vehicle to an angle of as much as 45°, leading to what is known as "side swiping" and in extreme cases to head on collisions.

It is the purpose of the present invention to equip the differential mechanism of an automobile with an attachment enabling the vehicle to be brought back to a normal position with its off wheel regaining the pavement without any danger to approaching automobiles and without changing the angle of the car to the road; and in other words enabling the driver of the vehicle to maintain the same in the normal condition which is parallel to the center of the road.

A further purpose of the invention is to achieve the foregoing purposes in a simple manner without entailing reconstruction of the standard form of automobile differentials and which involves only the substitution of a pin of a slightly modified form for the pin in the cage or spider of the conventional differential; supplemented by a casing of simple and economical form adapted to enclose the spider gears of the differential in such a way as to convert those gears into a pump active upon the lubricant which customarily bathes the entire differential unit, and which pump structure reacts upon the differential gears to momentarily check any differential action when one of the wheels tends to spin unduly, a condition met with in sand, clay, mud, or soft ground.

A still further object of the invention is to provide an improved method and process for governing and controlling the action of an automobile differential to momentarily suspend the differential action in a certain eventuality to give the driver of the vehicle time to adjust himself to the unusual driving conditions incident to running off the road with one drive wheel and enabling such driver to regain the traction of the road with both rear wheels before the automobile is subjected to such excessive differential action as would, or might, cause the vehicle to become unmanageable or out of control or acquire undue side sway to the discomfort and fright of the passengers and to the real danger of upset and collision.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view, with the casing removed, of a non-skid rear differential system for automobiles constructed in accordance with the present invention.

Figure 2 is a top plan view of the improved housing for the spider differential gears.

Figure 3 is a top plan view of the upper housing member.

Figure 4 is a top plan view of the lower housing member.

Figure 5 is a side elevation of the housing member shown in Figure 4.

Figure 6 is an end elevational view of the housing member shown in Figure 4.

Figure 7 is a plan view, on an enlarged scale, of the differential spider gears and pin with the holes through the modified form of pin.

Figure 8 is a face view of one of the axle section bevel gears, and

Figure 9 is a face view of one of the differential spider pinions.

Referring more particularly to the drawings, 1 designates the ring gear and 2 the driving pinion which are embodied in the conventional automobile differential construction. The usual differential housing 3 extends about these gears and serves to hold a quantity of heavy lubricant or grease in which the gears move.

At 4 are shown the roller bearings for the rear axle sections 14 and 15. As shown in Figure 7 these rear axle sections 14 and 15 have splined or otherwise fixed thereon the bevel gear wheels 6. Such bevel gear wheels mesh with pinions 7. The pinions are carried by the spider 16 which is also a usual member of an automobile differential construction. The spider carries pin 12 on which the pinions 7 rotate. The spider 16, pin 12 and pinions 7 revolve around bevel gears 6.

In accordance with the present invention I place a close fitting housing or casing about the gear wheel 6 and pinions 7. For convenience in applying the casing the same is made in half sections 5 and 5a and holes 11 are made in both sections of the casing and in the pin 12 to receive bolts 13 by which the two half sections 5 and 5a are clamped together and about the spider gears. At the center portion of each half section 5 and 5a are provided a number, preferably four, intake openings 8 for the admission of the grease or heavy lubricant or other hydraulically acting fluid or liquid.

The two sections of the casing may be identical. One such section is shown in Figures 4, 5 and 6. The interior of the section is made rounded to conform to the pin 12 and to the gears 6 and the pinion 7, all as shown in these figures in order that the casing may closely conform to these various differential parts about which it fits and thereby form restricted passages for the lubricant which enters through the intake openings 8, 9 and 10.

The invention necessitates no changes in the differential with the exception that the pin 12, an ordinary differential part, is bored to provide the two holes 11 shown in Figure 7. The added part, namely the casing 5, 5a is the only extra feature and this encloses the gears on each end of the axle together with the pinions. As shown this extra housing or casing 5, 5a encloses two gears and two pinions, but the same results are had with two gears and four pinions, as in trucks.

In the aggregate there are eight different holes 8, four on each side. All eight of these holes 8 are designed to take in oil, in which the ring gear works, at any differential movement of the wheels. If this movement is very slight, as in moving slowly around a corner or curve, the pressure of forcing this oil out through the neat fit between the teeth of the gears in the casing 5, 5a, is very slight. However when running at a speed of twenty five or more miles per hour, if the brakes are applied and one of such brakes should be greasy, the attempt of that wheel to continue to turn fast, causing skidding, is checked by the hydraulic pressure created within the gears and pinions due to the fact that there are no discharge holes in the casing or housing 5, 5a. Therefore the discharge requires to be squeezed out around the neat fit and therefore results, under medium or high speed, in establishing a hydraulic pressure sufficient to tie the two back or driving wheels together. This results in momentarily preventing skidding on the individual wheel, yet allowing a normal differential movement.

The ring gear and other parts of the differential are submerged in an oil bath. The oil is pulled into the differential gears 6 and 7 through the holes 8 and forced out, with any differential movement, around these gears and pinions and housing 5, 5a.

It is well understood that as long as an automobile is running on an even road there is no differential movement between the two axles 14 and 15. Therefore the ring gear 1, carrying the differential gear and pinions 7, constitutes an equal drive on both rear axle sections 14 and 15 and on both rear wheels. Under these circumstances there is no differential movements. While this condition obtains no oil is drawn in through the holes 8, or discharge. However, the space within the casing 5, 5a and the space all about the gears 6 and pinions 7 is still charged with oil from the last differential movement. Therefore the parts are in readiness to respond at the slightest differential movement of the two rear wheels other than the movements necessary to negotiate a curve or corner with each wheel holding its traction. However, if either of the rear wheels should break its traction power, as at an excess slippage, the abnormal differential action immediately sets up a hydraulic pressure in the gears sufficient to neutralize the difference, the same as the engine effect on the drive shaft.

It is further understood that this device is essential to cars wherein free wheeling or fluid drive is used. It is further understood that this hydraulic pressure does not take effect when going normally around corners or curves.

My experience has been that the great majority of drivers of automobiles apply brakes when going around corners. This is shown and checked by the tail lights of automobiles.

Experience has shown that automobiles should be checked in speed by the brakes before entering a curve and that it is a mistake to apply the brakes while actually on the curve. As a matter of fact the power should be gently applied while making the curve as a safety feature and also to reduce the wear on the tires as much as possible. When operating in this way the power is thrown on the outer wheel negotiating the larger arc of the curve. When the brakes are applied on curves such action sets up a greater friction on the outside faster wheels, causing excess heat in the brakes, and oftentimes being the cause of "side swipes" due to the vehicle tilting and swinging angularly.

With an attachment such as constructed in accordance with the present invention, if the brakes are applied when rounding a curve, the extra friction would be equalized through the gears forming a hydraulic pressure momentarily through the differential movement of one wheel running faster than the other. It will be understood, however, that the present device has no effect on slow moving vehicles.

On slippery roads, when brakes are applied suddenly, the condition causes a differential slippage which often turns cars around. This is avoided because in such case the gears set up a hydraulic pressure neutralizing the traction power.

It will be understood that the new non-skid feature is very simple as it consists of only two half shells surrounding the differential gears and pinions, being firmly held together by two bolts. It is readily adapted to the rear system of any automobile.

The device functions somewhat like a gear pump, for instance like what is referred to as an intake oil pump having an 8 shape. Such pumps create pressure through the intermeshing teeth of two gears, which gears pull the fluid in at one side and discharge it at the opposite side. Ordinarily while the pinions 7 are driving the gear wheel 6 in a straight line there is no relative rotary movement between the teeth of these pinions and gear wheels, and while the same are filled with the grease or oil, there is no pump action until one rear wheel varies in its relation with respect to the other. Then the pinions 7 begin to rotate about the pin 12. In case this movement is very slow as in ordinary cases of differential action where both rear wheels remain on the pavement the relative movement of the pinions and gears will not cause any such substantial hydraulic or pump action as would interfere with the normal differential action. However when one of the wheels gets off the road and into slippery mud, sand or other shifting ground, such wheel will tend to rotate at high rate of speed, thus causing the gear wheels and pinions to rotate commensurately.

The pump action of the intermeshing moving teeth will draw in a great supply of the heavy lubricant and concentrate it in the space within the teeth as it may be only discharged very slowly. This pressure of the oil between the teeth will momentarily suspend the differential action. Therefore the vehicle will not tend to turn angularly or to a position where it becomes out of control. This action will continue sufficiently long to give the driver an opportunity to get both wheels back on the pavement.

The invention therefore consists in the method or process of utilizing the pumping action of the differential through an oil supply already on hand to check and neutralize momentarily excessive and unwanted differential action.

What is claimed is:

1. In a non-skid system for automobiles in which axle gears mesh with differential pinions mounted on a rotary pin in a lubricant-containing housing, a sectional enclosure comprising a central block and an external shell carried thereby, said block so related to the gears and pinions as to substantially fill the included space between said gears and pinions, the sections of said block having part-cylindrical portions to closely fit about and form a bearing for the central portion of said pin, said block having substantially circular end portions for fitting against the inner ends of the pinions and closing the inner ends of the inter-teeth spaces thereof, said block also having substantially circular side portions for fitting against the inner ends of the gears and closing the inner ends of the inter-teeth spaces thereof, said block also having other walls lying along the outer edges of the teeth of the pinions and gears to close the inter-teeth spaces thereof, said block having openings through said walls to supply grease from the housing directly to the inter-teeth spaces, said shell having a plurality of circular portions extending with a neat fit over the outer ends of the teeth and adjacent walls of both the pinions and gears and fitting with a neat fit thereabout, said circular portions intersecting and being continuous along the intermeshing portions of the teeth of the gears and pinions, said shell having openings within the circular portions thereof to permit of the exudation of lubricant back into the housing.

2. In a non-skid system for automobiles in which axle gears mesh with differential pinions mounted on a rotary pin in a lubricant-containing housing, a sectional enclosure comprising a central block and an external shell carried thereby, said block so related to the gears and pinions as to substantially fill the included space between said gears and pinions, the sections of said block having part-cylindrical portions to closely fit about and form a bearing for the central portion of said pin, said block having substantially circular end portions for fitting against the inner ends of the pinions and closing the inner ends of the inter-teeth spaces thereof, said block also having substantially circular side portions for fitting against the inner ends of the gears and closing the inner ends of the inter-teeth spaces thereof, said block also having other walls lying along the outer edges of the teeth of the pinions and gears to close the inter-teeth spaces thereof, said block having openings through said walls to supply grease from the housing directly to the inter-teeth spaces, said shell having a plurality of circular portions extending with a neat fit over the outer ends of the teeth and adjacent walls of both the pinions and gears and fitting with a neat fit thereabout, said circular portions intersecting and being continuous along the intermeshing portions of the teeth of the gears and pinions, said shell having openings within the circular portions thereof to permit of the exudation of lubricant back into the housing, said pin having end portions for projecting beyond the pinions and beyond said shell and the circular portions thereof, and a rotatable spider engaged with the projecting ends of said pin.

3. In a non-skid system for automobiles in which axle gears mesh with differential pinions mounted on a rotary pin in a lubricant-containing housing, a sectional enclosure comprising a central block and an external shell carried thereby, said block so related to the gears and pinions as to substantially fill the included space between said gears and pinions, the sections of said block having part-cylindrical portions to closely fit about and form a bearing for the central portion of said pin, said block having substantially circular end portions for fitting against the inner ends of the pinions and closing the inner ends of the inter-teeth spaces thereof, said block also having substantially circular side portions for fitting against the inner ends of the gears and closing the inner ends of the inter-teeth spaces thereof, said block also having other walls lying along the outer edges of the teeth of the pinions and gears to close the inter-teeth spaces thereof, said block having openings through said walls to supply grease from the housing directly to the inter-teeth spaces, said shell having a plurality of circular portions extending with a neat fit over the outer ends of the teeth and adjacent walls of both the pinions and gears and fitting with a neat fit thereabout, said circular portions intersecting and being continuous along the intermeshing portions of the teeth of the gears and pinions, said shell having openings within the circular portions thereof to permit of the exudation of lubricant back into the housing, and fastening means for the sections of the enclosure engaged through said sections and through the intermediate portion of the pin.

4. In a non-skid system for automobiles in which axle gears are rotated by differential pinions rotating in a lubricant containing housing, a sectional enclosure, means to secure the sections of the enclosure upon such pinions and gears, said enclosure having walls fitting completely all around the entire circumferences of the inner portions of both the gears and pinions to close the inner ends of the inter-teeth spaces thereof, said shell having completely circular external portions lying with a neat fit against the outer parts of the pinions and gears and closing the outer portions of the inter-teeth spaces thereof to and including the intermeshing zones, said block having arcuate walls extending across the outer edges of the teeth of both the pinions and the gears excepting at the zones of intermeshing, said last mentioned arcuate walls having openings therein for access of lubricant from the housing directly to the inter-teeth spaces of all the gears and pinions, said shell having openings around the central portions of the gears and pinions to allow of the exudation of the lubricant.

5. In a non-skid system for automobiles in which axle gears are rotated by revolving differential pinions operating in a gear containing housing, an enclosure comprising inner and outer completely circular walls extending with a neat fit against the inner and outer edges of the teeth of the gears and pinions to substantially close the same, said circular walls intersecting across the zones where the teeth of the pinions and gears intermesh, said outer intersecting circular walls having openings at the central portions of the gears and pinions to permit of the exudation of lubricant and its escape from the interior of the shell into the surrounding housing, said enclosure having other walls extending across the inner edges of the teeth of the gears and pinions except at the intermeshing zones, said other walls having openings therethrough to permit of the passage of lubricant from the housing to the inter-teeth spaces of the gears and pinions.

VINCEN P. McVOY.